United States Patent

Weber

[15] 3,670,354
[45] June 20, 1972

[54] LOW PROFILE WIPER-WASHER ASSEMBLY

[72] Inventor: Alexander F. Weber, 6310 Marshall Road, Centerville, Ohio 45459

[22] Filed: Dec. 16, 1970

[21] Appl. No.: 98,643

[52] U.S. Cl. ........................................15/250.04, 15/250.35
[51] Int. Cl. ..............................................................B60s 1/46
[58] Field of Search ....................15/250.01, 250.02, 250.03, 15/250.04, 250.05, 250.06, 250.07, 250.3, 250.35

[56] References Cited

UNITED STATES PATENTS 3,427,675   2/1969   Tibbet ..............................15/250.04

FOREIGN PATENTS OR APPLICATIONS 1,295,138   4/1962   France..............................15/250.04
1,912,037   9/1970   Germany..........................15/250.04

Primary Examiner—Peter Feldman
Attorney—Harry A. Herbert, Jr. and Richard J. Killoren

[57] ABSTRACT

A windshield washer and wiper assembly having a hollow drive shaft for the wiper arm with fluid for the windshield being supplied through the shaft to a fluid transmission element. A tubular member connected to the fluid transmission element passes through the windshield wiper arm to a nozzle. A substantially circular shaped channel is provided in the windshield wiper arm to retain the tubular element within the wiper arm.

1 Claim, 5 Drawing Figures

PATENTED JUN 20 1972

INVENTOR.
ALEXANDER F. WEBER
BY Harry A. Herbert Jr.
ATTORNEY

Richard J. Killore
AGENT

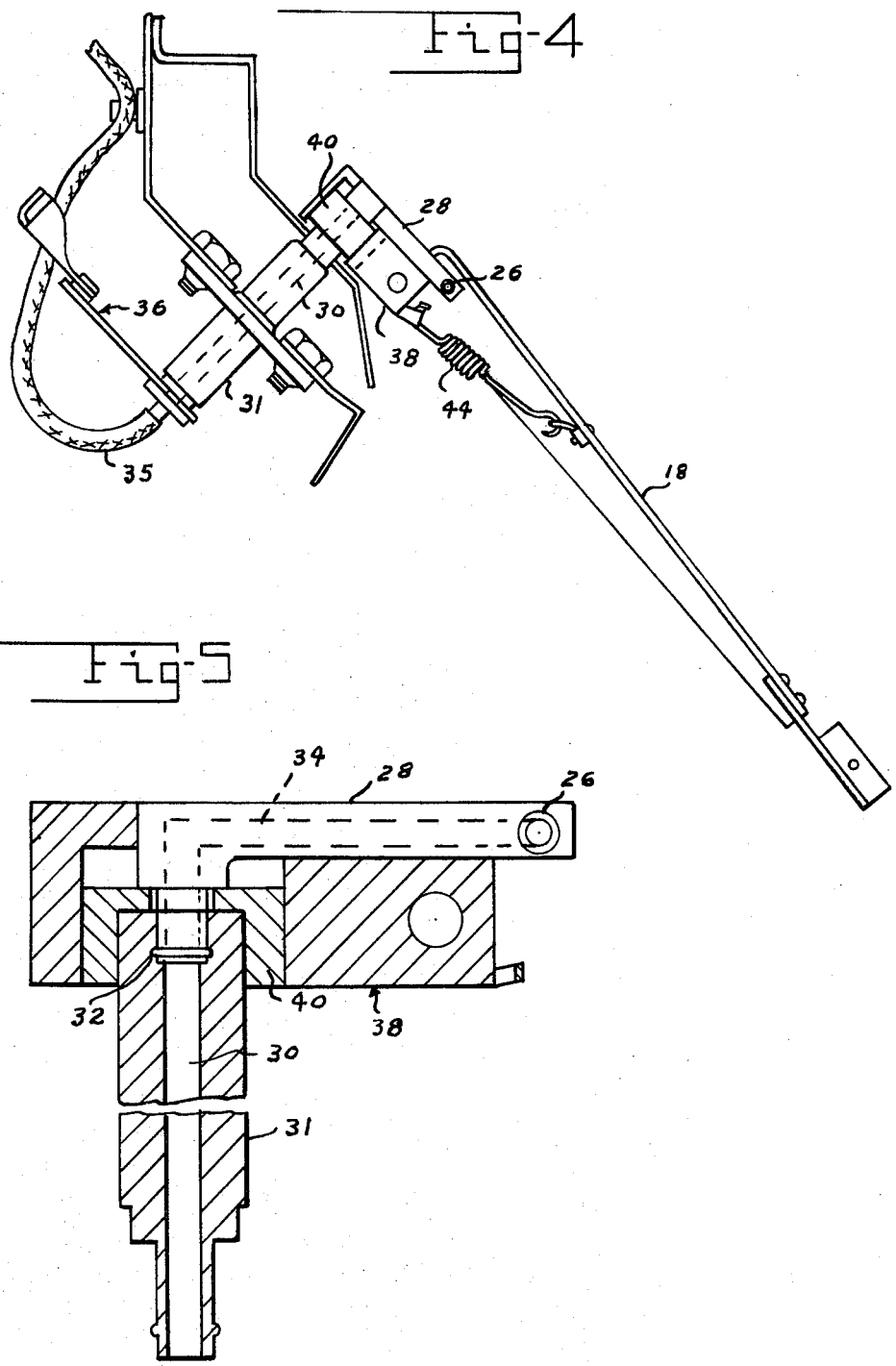

LOW PROFILE WIPER-WASHER ASSEMBLY

BACKGROUND OF THE INVENTION

In the art of windshield washers there are three conventional types known; separate jets located adjacent the base of the windshield, those wherein the liquid is supplied directly to the blade and those wherein the liquid is supplied through the windshield wiper arm. This invention is concerned with the third type wherein the liquid is supplied through the windshield wiper arm.

Devices of the type wherein the liquid is supplied through the windshield wiper arm are shown in the U.S. Pats., Roscoe, No. 3,234,579; Carpenter, No. 3,422,484; and Close, No. 3,448,482.

A low profile configuration for the windshield wiper arm is desirable for aesthetic purposes and because they are less susceptible to windage loss of the washer fluid and blade lift at the higher vehicle speeds. When low profile windshield washers and wipers are used, it has been the practice to supply the washer fluid through a flexible tube held in the arm by means of clamps, clips or other retainers. However, none of these positively held the hose within the wiper arm.

Also, there is a problem, in such apparatus, in supplying the washer fluid to the moving arm. In Roscoe, a complicated apparatus is used for this purpose, which is subject to leakage after there is some wear on the parts. In the device of Carpenter the hole through which the shaft 10 passes must be large enough to accommodate the tube 26 or a separate hole must be provided.

SUMMARY OF THE INVENTION

According to this invention, a channel through which the supply hose within the arm passes is provided which substantially surrounds the hose, which makes it impossible for the hose to come loose in the arm at high vehicle speeds. Also, means is provided for supplying fluid to the washer in the arm through the windshield wiper drive shaft.

IN THE DRAWINGS

FIG. 4 is a side elevational schematic illustration of the washer wiper assembly of the invention.

FIG. 5 is an enlarged view partially in section of the drive shaft and windshield wiper arm attachment for the device of FIG. 1.

DETAILED DESCRIPTION OF THE INVENTION

Figure 1:
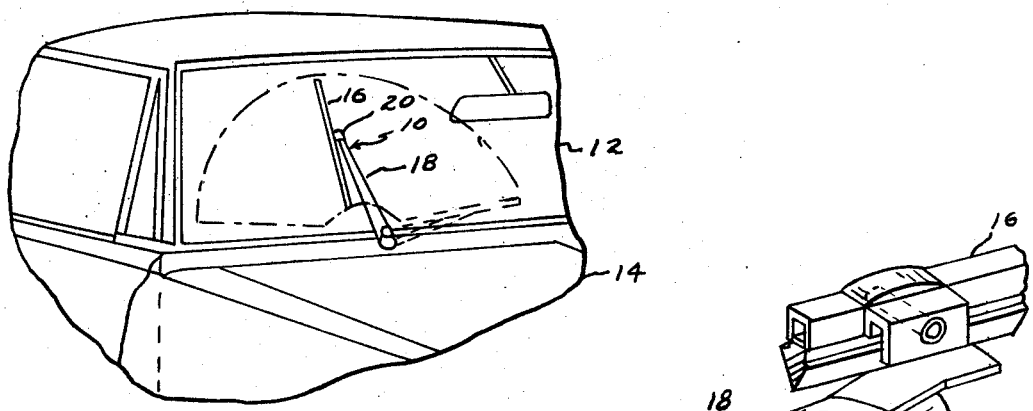
FIG. 1 is a fragmentary perspective view of a vehicle with the windshield washer and wiper arm assembly of the invention.

Reference is now made to FIG. 1 of the drawing which shows a window washer and wiper assembly 10 for cleaning a window 12 on an automobile 14. The washer and wiper assembly 10 has a conventional blade 16 secured to an arm 18 in the normal manner. Washer fluid is supplied to a nozzle 20 through arm 18 as will be explained later.

Figure 2:
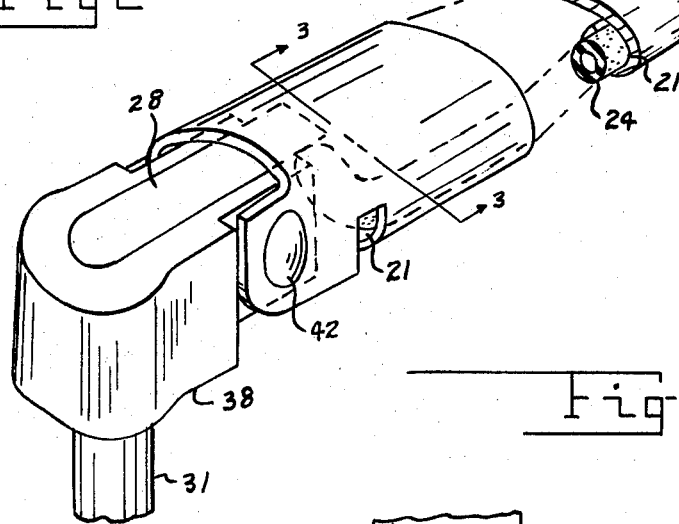
FIG. 2 is an enlarged perspective view partially in section of the washer and wiper warm assembly of FIG. 1.
Figure 3:
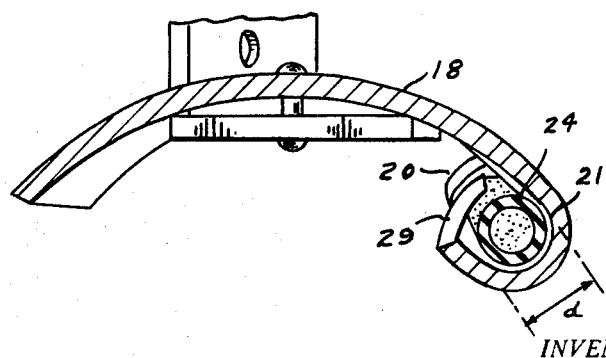
FIG. 3 is a sectional view of the device of FIG. 2 along the line 3—3.

As shown in FIG. 2, a substantially circular shaped channel 21 is formed at one side of arm 18 to retain a rubber tube 24. The rubber tube 24 is connected to the nozzle 20 at one end and to a fitting 26 on a fluid transmission element 28 at the other end. The tube 24 is inserted in channel 21 at the nozzle end and fed through the channel toward element 28. Channel 21 has a cut away portion 29 which is bent away from the tube 24 to permit the bending of tube 24 toward fitting 26 on element 28.

Fluid is supplied to the fluid transmission element 28 through channel 30 in the center of drive shaft 31. Element 28 has a fitting 32 which presses into the top of the drive shaft 31. A passage 34 in the element 28 communicates with passage 30 and supplies fluid to tube 24. A fluid supply hose 35 supplies fluid to channel 30 in the conventional manner.

The shaft 31 is driven in a conventional manner by a drive mechanism shown schematically at 36. Element 28 is held in a wiper arm mounting member 38 which is secured to a conventional splined fixture 40 on the drive shaft 31. Arm 18 is secured to mounting member 38 by means of a pivot pin 42. The windshield wiper is biased toward the windshield by a spring element 44 in the conventional manner.

There is thus provided a low profile windshield washer and wiper assembly which does not have the disadvantages of prior windshield washer and wiper assemblies.

What is claimed is:

1. A windshield washer and wiper assembly comprising: a drive shaft for the windshield washer and wiper; a fluid passage in said drive shaft; a windshield wiper arm, adapted to have a wiper blade attached to the end thereof; means for securing the wiper arm to said drive shaft; said securing means including an arm mounting member secured to said shaft and means for pivotably mounting the arm on the arm mounting member; a spring connected between said arm mounting means and the windshield wiper arm adapted to bias the arm toward the windshield; a washer nozzle positioned adjacent the end of said arm remote from said shaft; means, including a flexible tubular member located within arm, for supplying fluid from the passage in the drive shaft to said nozzle; said fluid supplying means including a fluid transmission element having a fitting for engaging the passage in the shaft and a fitting for engaging said tubular member; said channel means consisting of a rolled-over side portion of the windshield wiper arm which substantially surrounds said tubular member and has a cut away portion at the end which is bent away from the tubular member whereby the tubular member can be turned to engage the fitting on the fluid transmission element.

* * * * *